United States Patent [19]

Ahlen

[11] Patent Number: 5,241,147
[45] Date of Patent: Aug. 31, 1993

[54] METHOD FOR HEATING A TRANSPORT PIPELINE, AS WELL AS TRANSPORT PIPELINE WITH HEATING

[75] Inventor: Carl H. Ahlen, Nyheimsveien, Norway

[73] Assignee: Den Norske Stats Oljeselskap A.S., Stavanger, Norway

[21] Appl. No.: 678,990

[22] PCT Filed: Oct. 30, 1989

[86] PCT No.: PCT/NO89/00113
§ 371 Date: Apr. 30, 1991
§ 102(e) Date: Apr. 30, 1991

[87] PCT Pub. No.: WO90/05266
PCT Pub. Date: May 17, 1990

[30] Foreign Application Priority Data

Oct. 31, 1988 [NO] Norway ............... 88.4850

[51] Int. Cl.$^5$ ............... H05B 6/36; H05B 6/64
[52] U.S. Cl. ............... 219/10.51; 219/10.57; 219/10.79
[58] Field of Search ............. 219/10.51, 10.491, 10.79, 219/10.41, 10.57, 10.65, 10.79; 392/478, 468, 469, 480; 137/341; 138/33, 149; 405/154, 158, 178; 174/47

[56] References Cited

U.S. PATENT DOCUMENTS

| | | | |
|---|---|---|---|
| 1,260,564 | 3/1918 | Magnusson | 219/10.51 |
| 2,178,721 | 11/1939 | Daniels | 219/10.51 |
| 2,457,843 | 1/1949 | Strickland, Jr. | 174/47 |
| 3,335,251 | 8/1967 | Rolfes | 219/10.51 |
| 3,598,959 | 8/1971 | Ando | 219/300 |
| 3,617,699 | 11/1971 | Othmer | 219/535 |
| 3,665,154 | 5/1972 | Ando | 219/301 |
| 4,334,142 | 6/1982 | Blackmore | 219/535 |
| 4,361,937 | 12/1982 | Davis | 24/68 PP |
| 4,366,356 | 12/1982 | Ando | 219/10.51 |
| 4,645,906 | 2/1987 | Yagnik et al. | 219/10.51 |

FOREIGN PATENT DOCUMENTS 2197705 7/1991 United Kingdom .

OTHER PUBLICATIONS

Electric Heating System for pipelines . . . Sectracing, Pipe Heating Systems, Inc.
Moving the Arctic Oil; Donald F. Othmer and John W. E., Griemsmann Mechanical Engineering, Nov. 1971 pp. 27-31.
Heating Pipelines With Electrical Skin Current, Masao Ando and Donald R. Othmer Chemical Engineering Mar. 9, 1970.
Skin Effect Current Tracing Ric-Wil Incorporated.

Primary Examiner—Bruce A. Reynolds
Assistant Examiner—Michael D. Switzer
Attorney, Agent, or Firm—Foley & Lardner

[57] ABSTRACT

A method and apparatus for heating a transport pipeline by inductive heating. The transport pipeline has a thermal insulator mounted on an outside surface thereof. A pair of parallel extending electric wires without metallic protection, are mounted on an outside surface of the thermal insulator.

9 Claims, 9 Drawing Sheets

FIG.9

METHOD FOR HEATING A TRANSPORT PIPELINE, AS WELL AS TRANSPORT PIPELINE WITH HEATING

This invention relates to a method for heating a transport pipeline. The invention also relates to a transport pipeline with heating.

TECHNICAL FIELD

The invention is developed in connection with so-called multiphase transport, i.e. transport of mixtures of gas, oil and water through pipelines. Such multiphase transport has increasingly been regarded as more attractive over longer distances. The main reason is the desire to be able to reduce the number of platforms in the sea and/or the size of them. In this way, it will be economically viable to develop more oil and gas fields. Multiphase transport from subsea installations to central platforms or directly to land, offers many new challenges.

One of the problems to be faced in the case of transport of unprocessed well stream, is the risk of hydrate formation. At low temperatures, under 20° C., and high pressure, hydrocarbons (gas) and water can form a solid phase which can prevent flow in pipes, pumps and valves. Hydrate formation can be prevented by removing water from the well stream. Such processing is very difficult to carry out on the sea bed. Other known methods are injection of methanol or glycol. Where there are large volumes of water in the well stream, the consumption of such inhibitors will be very great. The cost of regeneration through distillation is also high. In addition there are costs for installation, operation and maintenance of pipelines, pumps and valves for injection. Deposits of wax can cause problems for the operational stability.

An alternative to the use of inhibitors is insulation of pipelines combined with heating. In order to prevent the formation of hydrate during prolonged unforeseen operational stand-stills or to achieve the melting of hydrate which has been formed, energy must be supplied. The need for power will be strongly dependent on the total heat transfer coefficient of the pipeline and the length of the pipeline. Calculations show that for long pipelines, very good insulation materials are required, e.g. foamed polyurethane. In the case of operational stand-stills, typical power requirement for keeping the temperature at 25° C. in a 20" pipeline on the seabed, where there is an ambient temperature of 4° C., is 50–100 W/m.

The use of a few electrically heated pipelines on the sea bed is known. These pipelines are all relatively short, they have a length of less than 5 km and they are installed in one single towed-out length. For longer pipelines, the problems increase, partly due to a greater power requirement and partly due to a considerable increase in the number of electric joints when conventional laying technique is used.

Heating of pipelines can take place in several ways:
1. Heating cable
2. Inductive methods, e.g. the known SECT
3. Impedance method-use of the steel pipe as electric resistance element.

Currently known techniques, using conventional heating cables or the mentioned induction method SECT (Skin Effect Current Tracing CHISSO Engineering, Japan) is not known to have been utilized over long distances. These known methods appear to have a low reliability underwater due to a large number of joints.

DISCLOSURE OF INVENTION

The present invention aims at using inductive heating, particularly combined with the use of conventional laying methods, so-called S- and J-laying, combined with thermal insulation of the pipeline.

According to the invention, a method is therefore suggested for heating a transport pipeline by induction, and the method is characterized in that a magnetic field is provided, which magnetic field in the case of induction generates heat in the transport pipeline, in such a way that mutual, preferably parallel conductors are utilized as induction wires. The power supply can be single-phase or three-phase and the frequency either available grid frequency (50 or 60 Hz) or an optimized frequency provided by a particular converter. The physical basis for the calculation of heat generation in the pipes in Maxwell's equations expressed in differential form. These equations provide the relation between electric and magnetic quantities. The arrangement of the conductor in or on the surface of the insulation coating will be determined by such considerations as maximum heat development and laying technique.

According to the invention a transport pipeline with inductive heating is also suggested, which transport pipeline is characterized in that it is thermally insulated on the outside and on the outside of the thermal insulation there are mutually preferably parallel extending electric electrical conductors without metallic screen or protection.

The pipeline should preferably be made of a ferromagnetic material or be produced as a composite pipe with at least one layer of ferromagnetic material.

It has been seen to be particularly advantageous to utilize a coating with a very good electrical conductivity on the outside of the ferromagnetic steel pipe. A suitable coating material can be aluminium. Calculations and practical tests show that the heating will be considerably improved. This means that induced power increases with an aluminium coating on a steel pipe. Maximum effect is achieved for various thicknesses of aluminium coating for different steel pipe dimensions.

As an example, maximum effect for an 8" (approx. 200 mm) steel pipe occurs with an aluminium coating thickness of 0.8 mm, and the effect will be approximately four times the effect without coating.

For a 22" (approx. 560 mm) steel pipe, maximum effect will occur with a thickness of aluminium coating of 0.3 mm, and the effect will be approximately twice the effect without coating.

The invention makes possible a preferred utilization of the conventional laying methods, namely S- and J-laying. In practice the invention can be implemented in that such a pipe or such a transport pipeline which is to be layed, is insulated thermally in suitable lengths (usually 12 m) on land. On the laying-barge the joints are thermally insulated after welding and inspection are completed. Before the pipe then leaves the laying-barge, for example over a stem ramp, electric wires are mounted on the outside of the pipe insulation. This can take place after the pipeline has passed through the usual rectifying/braking devices on the laying ramp. The electric wires or cables will therefore not be in the way during this part of the process. Existing laying equipment can be easily modified so that it becomes possible to mount the electric wires before the pipeline enters the sea.

For heating of the layed transport pipeline, the mentioned electric conductors are connected to an electric system. When connected to the electric system, the electric conductors will provide a magnetic field which due to induction will generate heat in the pipeline. The electric conductors or cables must not have a magnetic screen which hinders expansion of the magnetic field, or low impedance screen where currents are created which in turn counteract the magnetic field from the conductor.

In addition to the fact that conventional laying technique can be utilized advantageously without reduction in laying rate, the advantage of being able to use very long lengths of cable is also achieved. The cables do not have to be joined at each length of pipe (12). Long lengths of cable can be advantageously handled by means of cable drums.

A particular advantage is that the electric cables do not need to penetrate the insulation coating around the pipe, where in such a situation there would be an increased danger of water penetration and reduction of the thermal properties of the insulation.

Another advantage is that a cable placed outside the pipe insulation will not be a hindrance during application of insulation.

Tests have shown that the new method is economically viable compared with other methods, for example the SECT system, which demands extra pipes, water welding and a multitude of joints.

BRIEF DESCRIPTION OF DRAWINGS

The invention shall be described more closely with reference to the figure drawings, where.

BEST MODE FOR CARRYING OUT THE INVENTION

Figure 1:
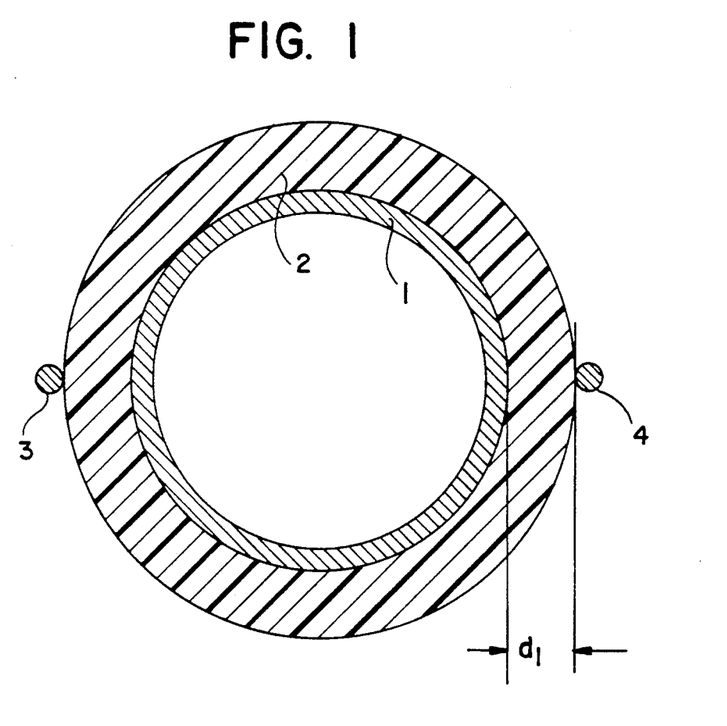
FIG. 1 shows an example of a transport pipeline according to the invention, in the form of a cross-section of the pipeline with external insulation and electric wires placed on the outside of this.

In FIG. 1 a pipeline 1 of a suitable steel material (ferromagnetic) is shown. A heat insulation 2 is applied to the outside of the pipe 1. Two electric wires 3 and 4 are mounted on the outside of the heat insulation, in this case diametrically opposite to each other and along the pipeline. These electric cables 3 and 4 are placed on the outside of the heat insulation 2 immediately prior to the pipe leaving a laying-barge, and after the pipe has passed through the rectifying/braking devices mounted on the lay ramp. The transport pipeline can therefore, as anyone skilled in the art will understand, be immediately laid by means of conventional laying methods, since the electric cables will not interfere.

In the embodiment the electric cable 3 can be forward conductor and the electric cable 4 can be return conductor for the current.

FIG. 1 shows a two-conductor configuration. Use of three cables and three-phase system can also be considered. For redundance, extra conductors can be considered for use.

For electricity, alternating current is utilized. A frequency of 50 Hz or 60 Hz is usually used. Higher frequencies are sometimes advantageous when power generation increases. Due to low depth of penetration, electric currents will not run on the internal surface of the pipe. Increased corrosion will therefore not occur on the inside by using the new heating method.

The field strength of the steel will naturally be of importance. As is known, the field strength decreases with increased distance between electric conductor and the steel pipe. Tests have shown that necessary generation of power will be attained in distances which allow mounting of an adequate thermal insulation 2 between pipe 1 and the induction cables 3,4.

In the table provided below the results from the tests are shown.

TABLE 1

| I<br>A | P<br>W/m | $d_1$<br>mm |
|---|---|---|
| 600 | 35,5 | 0 |
| 700 | 49,5 | " |
| 800 | 63,7 | " |
| 900 | 78,3 | " |
| 1000 | 96,5 | " |
| 600 | 24,9 | 45 |
| 700 | 32,8 | " |
| 800 | 41,7 | " |
| 900 | 55,8 | " |
| 1000 | 66,9 | " |
| 600 | 21,3 | 95 |
| 700 | 27,7 | " |
| 800 | 33,8 | " |
| 900 | 41,1 | " |
| 1000 | 56,3 | " |

Induced effect in steel pipe 457/381 mm.
Alternating current 50 Hz.
Cables placed as in FIG. 1.

Figure 2:
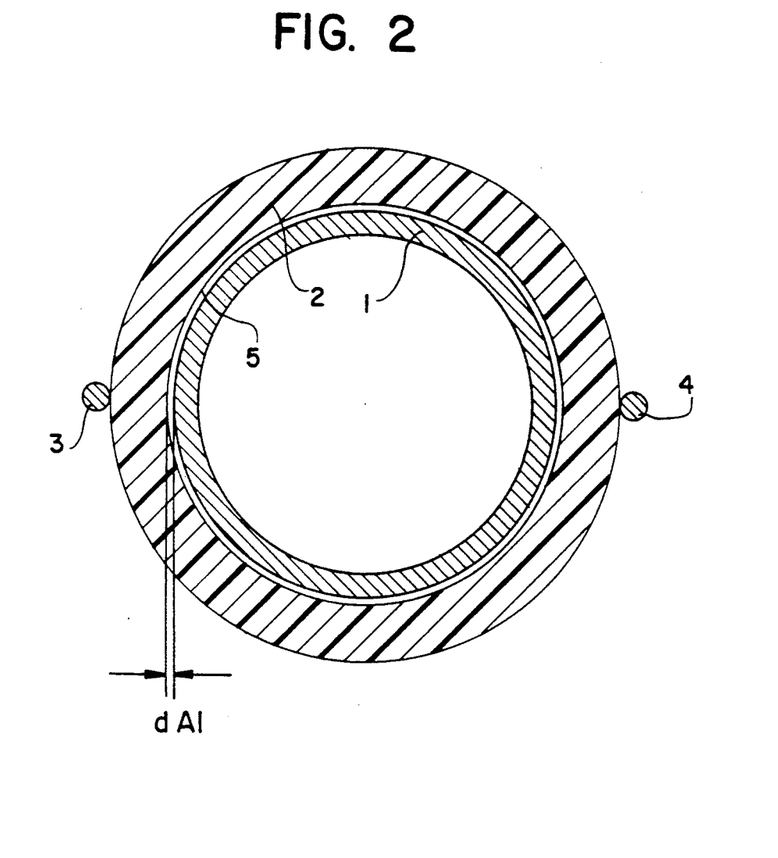
FIG. 2 shows a cross-section of a modified conductor embodiment, with an aluminium coating on the pipe made of steel.

The pipe shown in cross-section in FIG. 2 is designed as the pipe in FIG. 1, but with the important exception that the steel pipe 1 has a coating 5 of aluminium. The insulation is, as in FIG. 1, indicated with 2, and the electric conductors with 3 and 4. The thickness of the coating 5 is indicated with $d_{AL}$.

Figure 3:
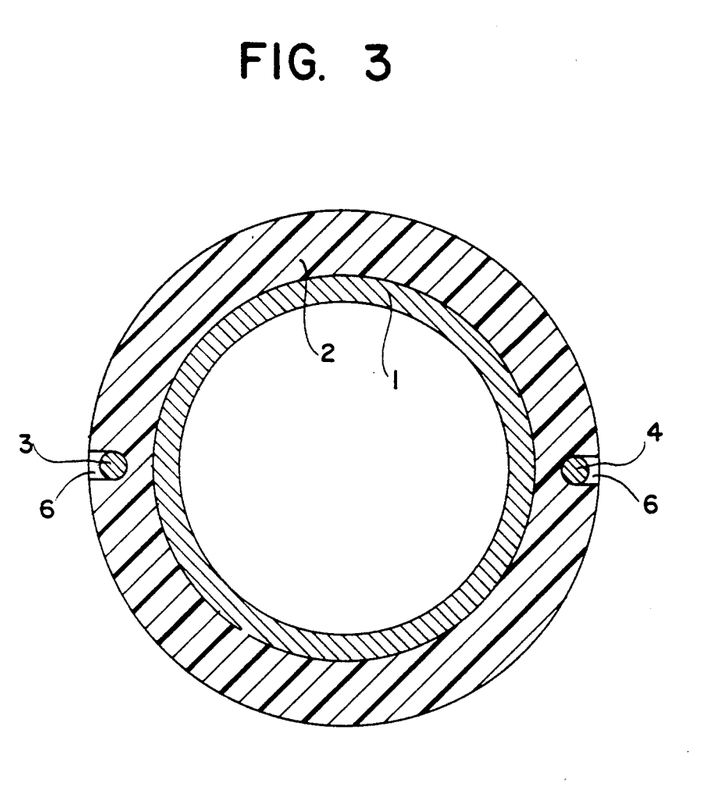
FIG. 3 shows a cross-section of a modified cable placing. The electric conductors are here inserted in grooves which are made in the thermal insulation.

FIG. 3 shows electric wires which are placed in grooves 6 which are made in the thermal insulation. Shorter distance between the conductors and steel pipe causes increased efficiency. The conductors acquire, since they in this case are incorporated in the periphery of the pipe, a position less exposed to mechanical damage. The cables can be secured in the grooves and protected by being covered with a sticky and possibly auto-vulcanizing material.

Figure 4:
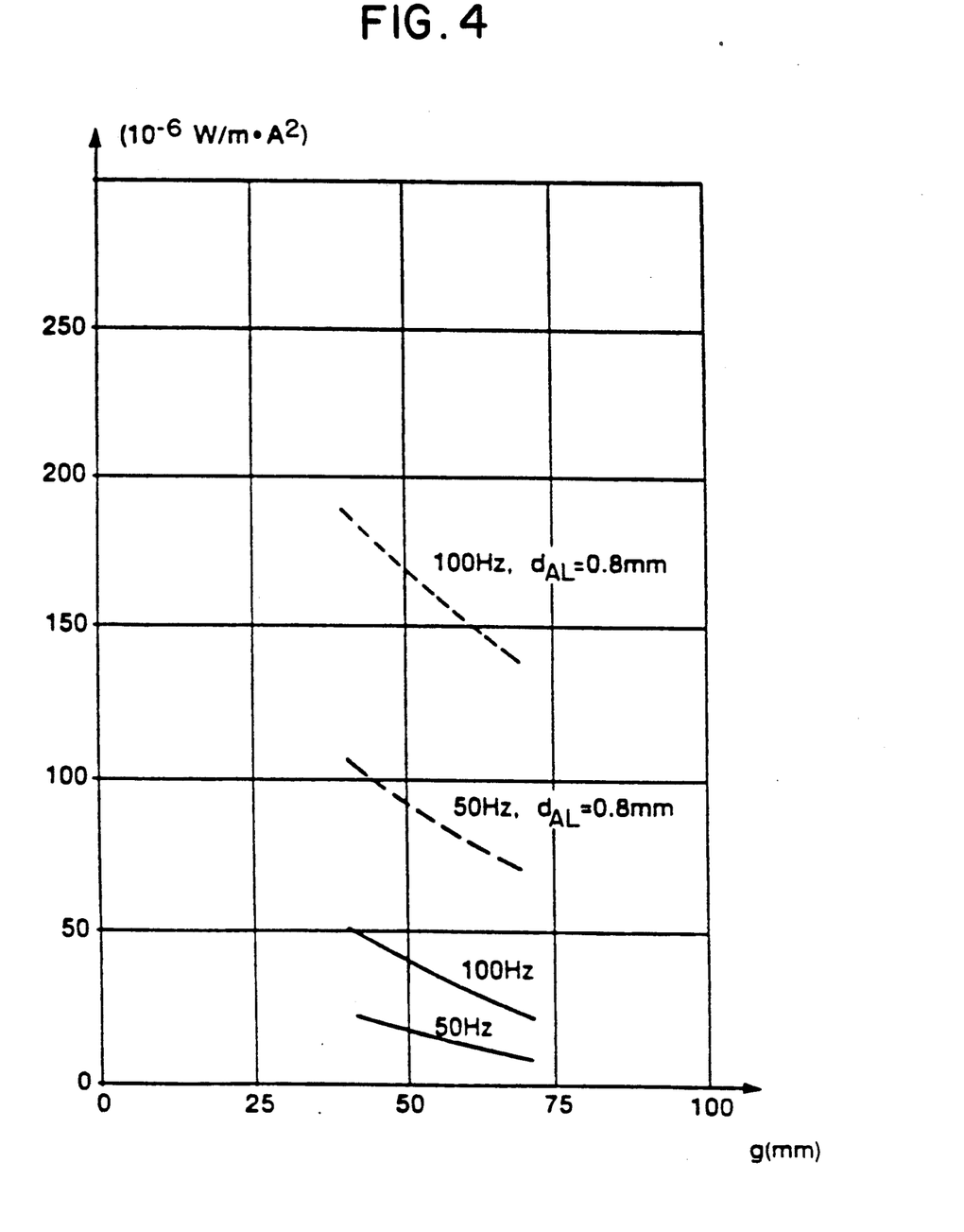
FIG. 4 shows a diagram where induced power is plotted as a function of the distance between electricity conductor and pipe, for a single-phase system.

FIG. 4 shows in the diagram induced power in an 8" steel pipe as a function of the distance from conductor to pipe. Two cables 3 and 4 (single-phase system) are assumed placed 180° apart at equal distances from the pipe. The calculations are based upon a steel pipe design without aluminium coating fully drawn curves-and a steel pipe design with an aluminium coating with a thickness of $d_{AL}$ equal to 0.8 mm-stippled curves. Resistivity $\rho$ for magnetic steel is designated equal to 0.2 $\Omega mm^2/m$, the relative equivalent permeability $\mu_r$ to 1000, and the resistivity $\rho_{AL}$ for aluminium is designated equal to 0.028 $\Omega mm^2/m$. From FIG. 4 it is clear that the induced losses for a pipeline with aluminium coating are greater than for a pipeline without aluminium coating. The diagram also shows that an increase from 50 Hz to 100 Hz involves a great increase in generated power.

Figure 5:
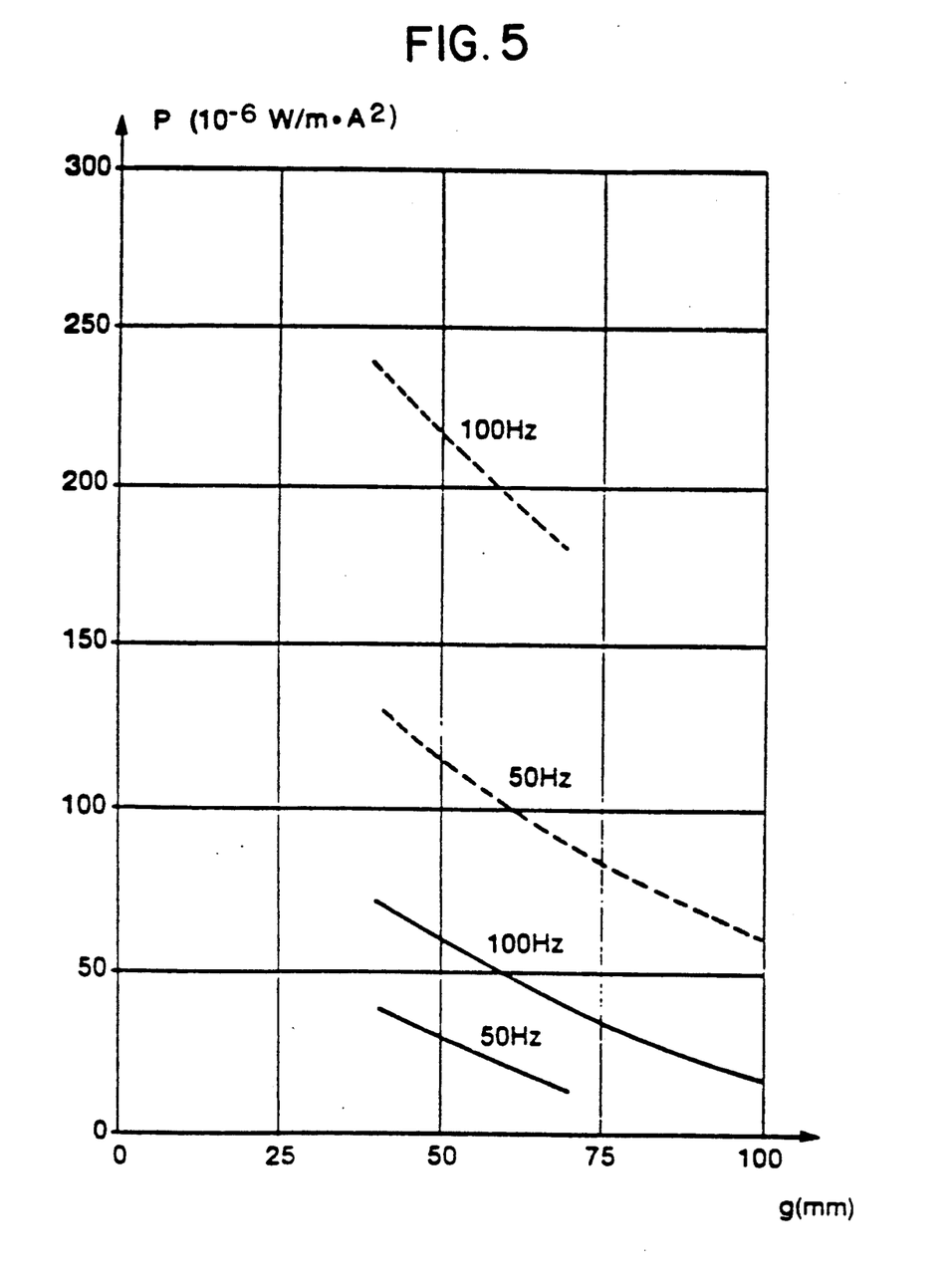
FIG. 5 shows a diagram where induced power is drawn as a function of the distance between electric conductor and pipe, for a three-phase system.

FIG. 5 shows a diagram as in FIG. 4, for the same pipeline embodiment, but with three cables (three-phase system) mounted at angles of 120° between each other. A clear difference is seen here also, between pipes with and pipes without aluminium coating regarding induced power. The frequency is also in this case of great importance to power generation in the pipe.

Figure 6:
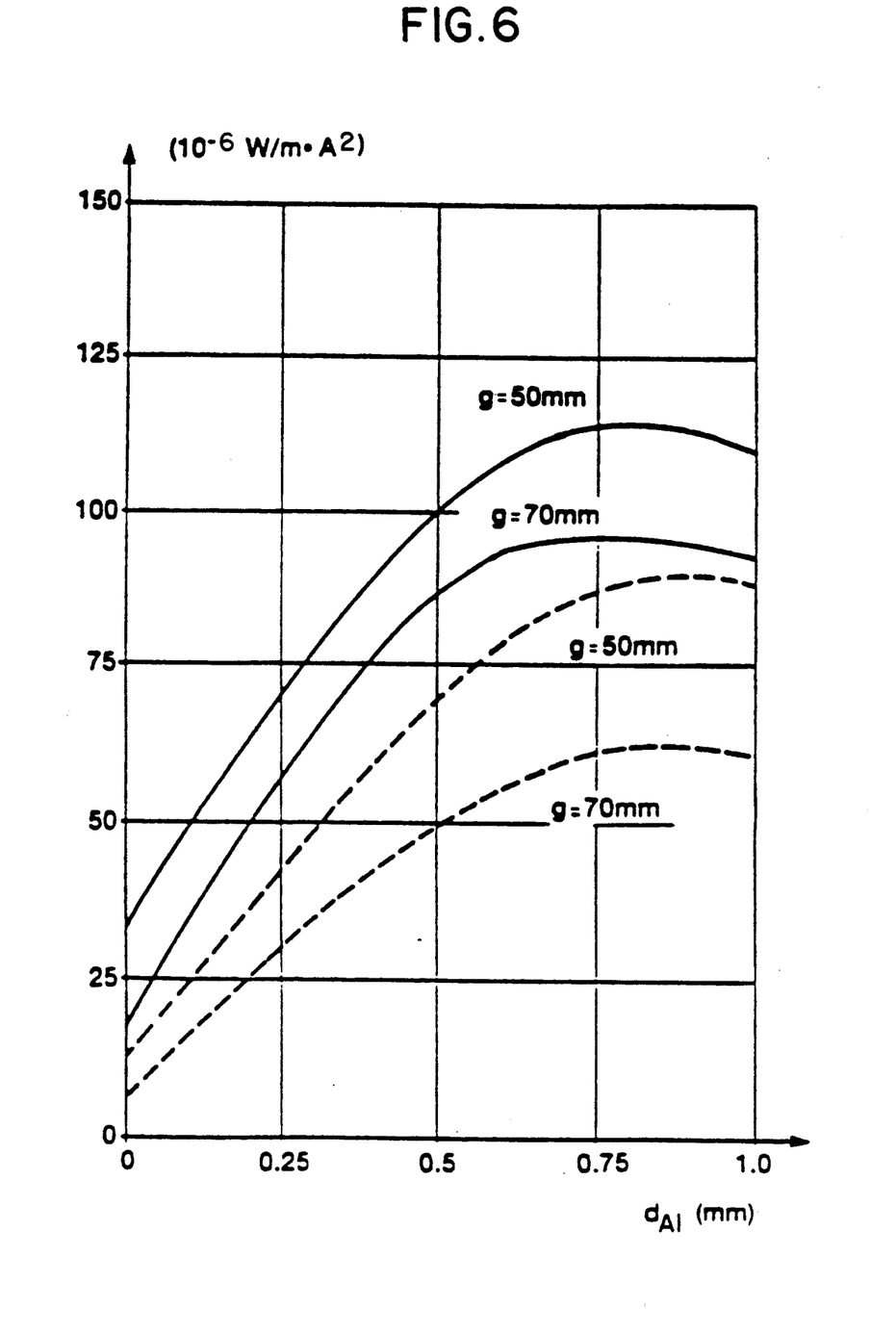
FIG. 6 shows a diagram where induced power is drawn as a function of the thickness of an aluminum coating.

Induced effect is a function of the thickness of the aluminium coating. This is shown in FIG. 6. Stippled curves represent a single-phase system and unbroken curves a three-phase system.

The results in FIG. 4-6 apply to 8" pipes. For other pipe dimensions the values will be otherwise. For example a 22" pipe will achieve maximum power generation for an aluminium coating with a thickness of approximately 0.35 mm. The induced effect with this thickness will be more than twice the effect induced in a steel pipe without aluminium coating.

Figure 7:
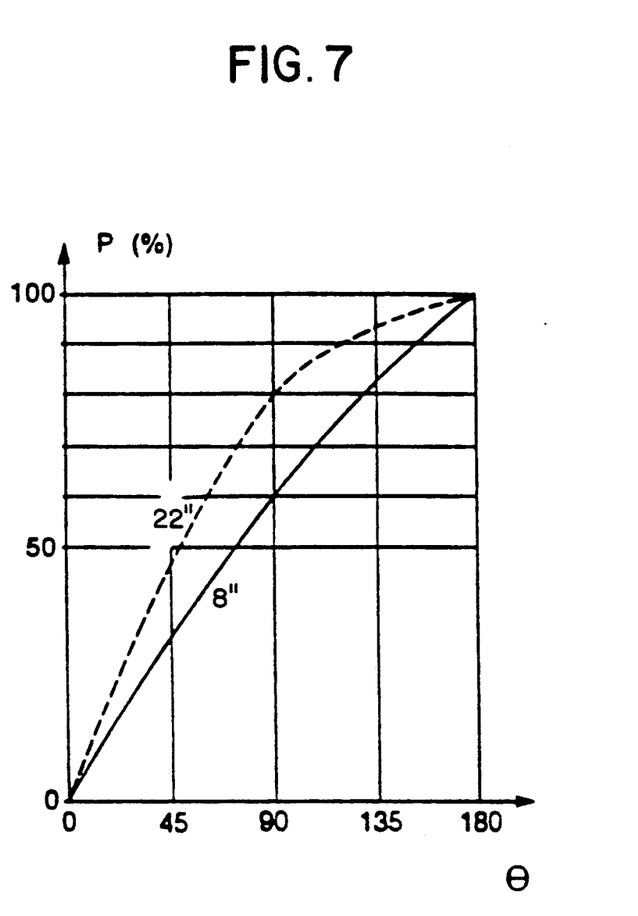
FIG. 7 shows a diagram where total induced power is drawn as a function of the central angle $\theta$ between the electric conductors in a single-phase system.

In FIG. 1 and 2 the two conductors are placed diametrically opposite to each other. Deviation from this symmetry influences induced power. An example is shown in FIG. 7, for respectively an 8" pipe unbroken curves and a 22" pipe-stippled curves—both with an aluminium coating. The diagram in FIG. 7 shows total induced power as function of the angle $\theta$ between the two conductors. The effect in percent (with the effect at $\theta$ equal to 180° as reference) is independent of the thickness $d_{AL}$ of the aluminium coating, and of the distance g between cable conductor and steel pipe when 50 mm $\leq$ g $\leq$ 70 mm. Corresponding conditions will occur for a three-phase system, when angle $\theta$ deviates from 120°.

Figure 8:
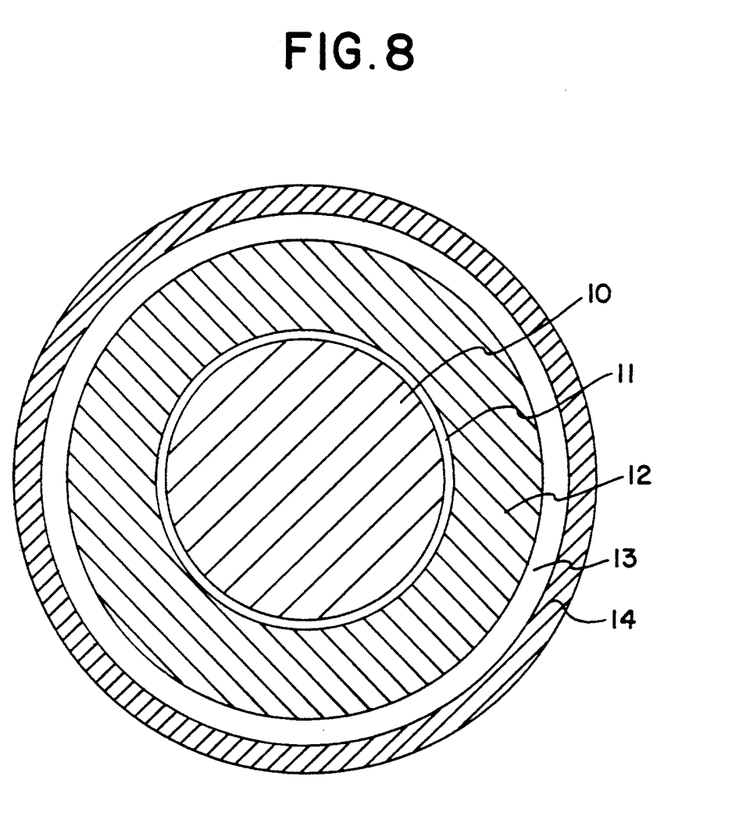
FIG. 8 shows a cross-section through a typical cable embodiment which can be utilized.

An example of a feasible cable embodiment is shown in FIG. 8. The cable has a simpler construction than a conventional underwater cable. This is because basically the cable is to be secured to a pipeline and steel reinforcement will not be necessary. The construction can be based on a standard PEX-insulated cable for a voltage range from 12 kV to 52 kV with a copper conductor.

The cable in FIG. 8 is assembled with a central conductor 10 with a conductor screen 11 (semi-conductor layer). This is followed by an electric insulation 12 (cross-linked polyethylene) and then an insulation screening 13 (semi-conductive layer). On the outside of this is an outer protection 14.

Figure 9:
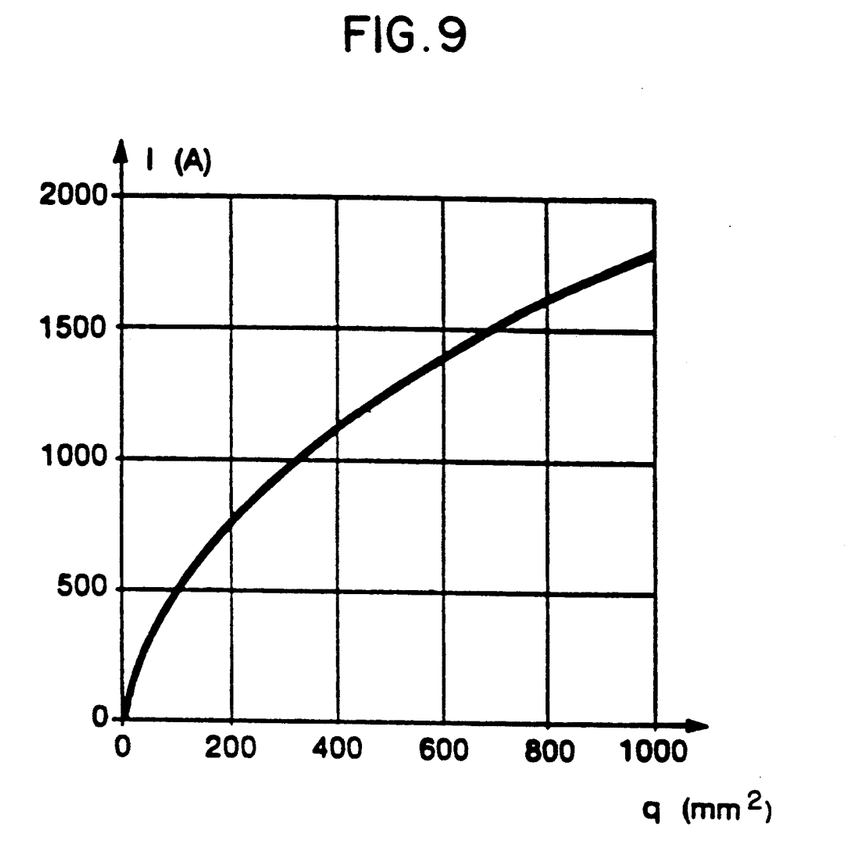
FIG. 9 shows the maximum current in an underwater cable for various areas of cross-section of a copper conductor which is exposed to seawater with a temperature of 5° C.

FIG. 9 shows the maximum current as function of the cross-sectional area of a copper conductor, for a voltage range of from 12 kV-24 kV and a frequency of 50 Hz, with an ambient water temperature of 5° C.

A power generation of 200 W/m will require a cable current of 1.0 kA-1.3 kA. A cable with a copper conductor cross-section of about 400 $mm^2$-600 $mm^2$ will be suitable.

I claim:

1. A method for heating a steel transport pipeline having individual sections using induction heating generated by means of a changing magnetic field inducing eddy currents, comprising the steps of:
   (a) laying out and connecting individual sections of the transport pipeline;
   (b) after step (a), placing a plurality of continuous extending unshielded conductors running parallel to each other in grooves in an outer surface of a thermal insulating layer which is arranged on the transport pipeline, such that the conductors run continuously along an outer surface of the transport pipeline parallel to a longitudinal axis of the transport pipeline and across joints formed by the connection of the individual sections; and
   (b) supplying single-phase or three-phase electrical power to the conductors thereby generating the eddy currents and the heat, via the conductors, into the transport pipeline.

2. A steel transport pipeline with inductive heating, comprising:
   a thermal insulator having a plurality of grooves therein and being mounted on an outside surface of the transport pipeline; and
   a pair of electric wires, without metallic protection, each being mounted in a corresponding one of said grooves in a parallel relationship to each other and to a longitudinal axis of the transport pipeline, said electric wires being galvanically insulated from the transport pipeline;
   wherein at times when said electric wires are supplied with electrical power, said electric wires produce eddy currents and heat in said transport pipeline.

3. A transport pipeline according to claim 2, wherein the transport pipeline has an external coating thereon which is a very good electric conductor.

4. A transport pipeline according to claim 3, wherein the external coating is made from aluminum.

5. A transport pipeline according to claim 2, wherein each of said electric wires is covered with a sticky protective material.

6. A transport pipeline according to claim 2, wherein each of said electric wires is covered with an auto-vulcanizing material.

7. A method for laying out a heatable transport pipeline having a thermal insulator on an outer surface thereof, comprising the steps of:
   (a) joining a plurality of pre-fabricated pipeline sections to form the transport pipeline; then
   (b) separately mounting at least two pre-fabricated, continuous, unshielded, full length electric wires in grooves on an outer surface of the thermal insulator during the laying out of the transport pipeline, such that said electric wires run continuously along an outer surface of the transport pipeline parallel to a longitudinal axis of the transport pipeline and across joints formed by the joining of the pipeline sections; and
   (c) supplying electric power to said electric wires thereby generating eddy currents and heat in said transport pipeline via said electric wires.

8. A method according to claim 7, further comprising the step of completely covering the electric wires with an insulating material.

9. A method for laying out a heatable transport pipeline having a thermal insulator on an outer surface thereof, comprising the steps of:
 (a) joining a plurality of pre-fabricated pipeline sections to form the transport pipeline;
 (b) embedding at least two pre-fabricated, continuous, unshielded, full length electric wires in grooves in the thermal insulator during the laying out of the pipeline, such that said electric wires run continuously along an outer surface of the transport pipeline parallel to a longitudinal axis of the transport pipeline and across joints formed by the joining of the pipeline sections; and
 (c) supplying electric power to said electric wires thereby generating eddy currents and heat in said transport pipeline via said electric wires.

* * * * *